United States Patent [19]
Matousek

[11] 3,735,956
[45] May 29, 1973

[54] BALL VALVE AND IMPROVED SEAT ARRANGEMENT

[75] Inventor: Stephen Matousek, Moraga, Calif.
[73] Assignee: Whitey Research Tool Co., Emeryville, Calif.
[22] Filed: Apr. 10, 1972
[21] Appl. No.: 242,861

Related U.S. Application Data

[63] Continuation of Ser. No. 41,503, May 28, 1970, abandoned.

[52] U.S. Cl. ..........................251/315, 137/454.6
[51] Int. Cl. ................................F16k 5/06
[58] Field of Search..................251/309, 315, 316, 251/317, 171, 159, 164, 167; 137/454.5, 454.6

[56] References Cited

UNITED STATES PATENTS

| | | | |
|---|---|---|---|
| 2,117,456 | 5/1938 | Schellin | 251/309 X |
| 2,421,332 | 5/1947 | Johnson | 251/171 X |
| 2,424,210 | 7/1947 | Sutton | 251/167 |
| 2,885,179 | 5/1959 | Hoatmann | 251/315 |
| 3,041,036 | 6/1962 | McFarland, Jr. | 251/315 X |
| 3,072,379 | 1/1963 | Hamer | 251/171 |
| 3,124,334 | 3/1964 | Szohatzky | 251/214 |
| 3,192,943 | 7/1965 | Moen | 137/454.6 X |
| 3,223,111 | 12/1965 | Anderson | 251/171 X |
| 3,236,495 | 2/1966 | Buchholz | 137/454.6 X |
| 3,244,398 | 4/1966 | Scaramucci | 251/315 X |

*Primary Examiner*—Samuel Scott
*Attorney*—Fay, Sharpe and Mulholland

[57] ABSTRACT

The specification and drawings show a ball valve including a housing defining a valve chamber which is of cylindrical configuration. Inlet and outlet flow passages extend into the housing and connect with the chamber. A ball member is positioned in the chamber with its center located generally at the intersection of the axes of the flow passage and the axis of the chamber. A resilient, resinous packing completely encloses the ball and fills substantially all voids between the ball and the inner walls of the chamber. Circular ports are formed through the packing at locations aligned with the inlet and outlet passages and the center of the ball. The outer ends of the ports terminate at the inner of the chamber and about the associated passageway, whereas, the inner ends of the ports terminate adjacent the surface of the ball. A circumferential, cylindrical recess is formed inwardly from the outer end of each port and terminates closely adjacent the inner end of the port to leave a continuous circumferential lip of packing material extending radially inwardly of the port adjacent the ball. Positioned in each recess is a relatively rigid ring member having an axial opening of a diameter substantially equal to the diameter of the associated passage, and an outer diameter which engages the wall of the recess. The axial length of the ring is substantially equal to the length of the recess. Preferably, the inner end of the ring closely engages the lip, whereas the outer end is shaped to engage the inner wall of the chamber about the associated port.

4 Claims, 5 Drawing Figures

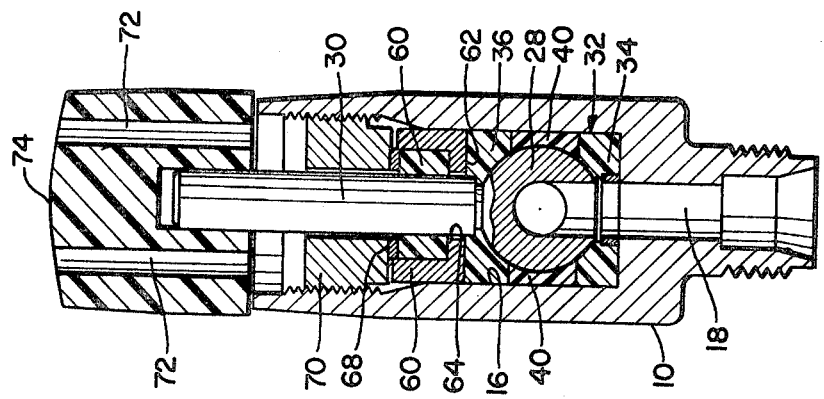
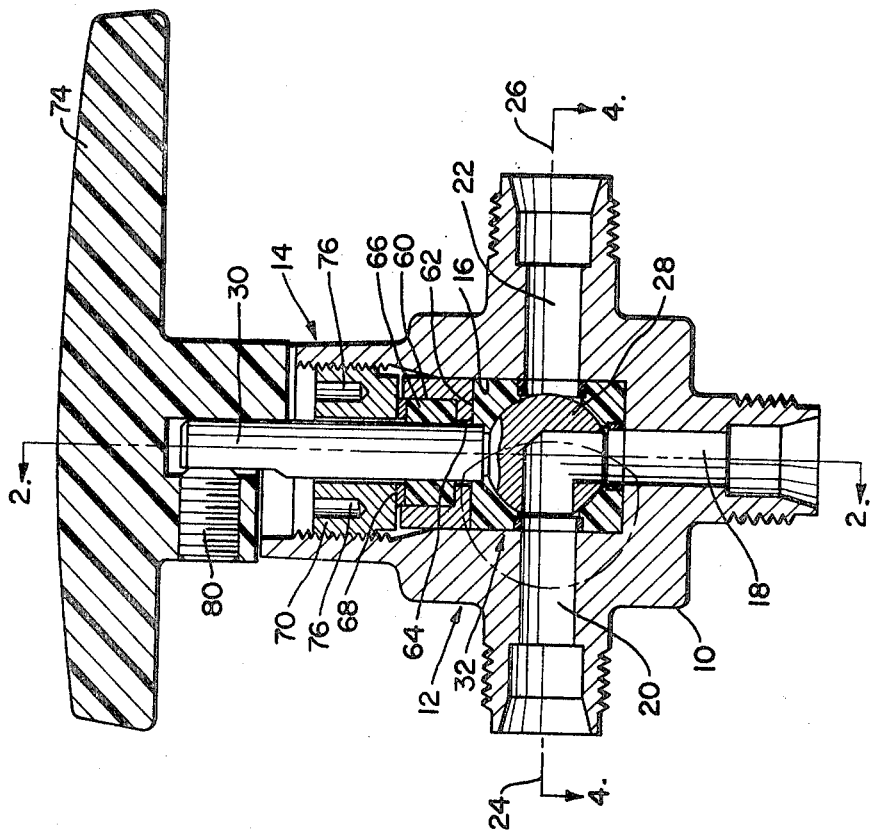

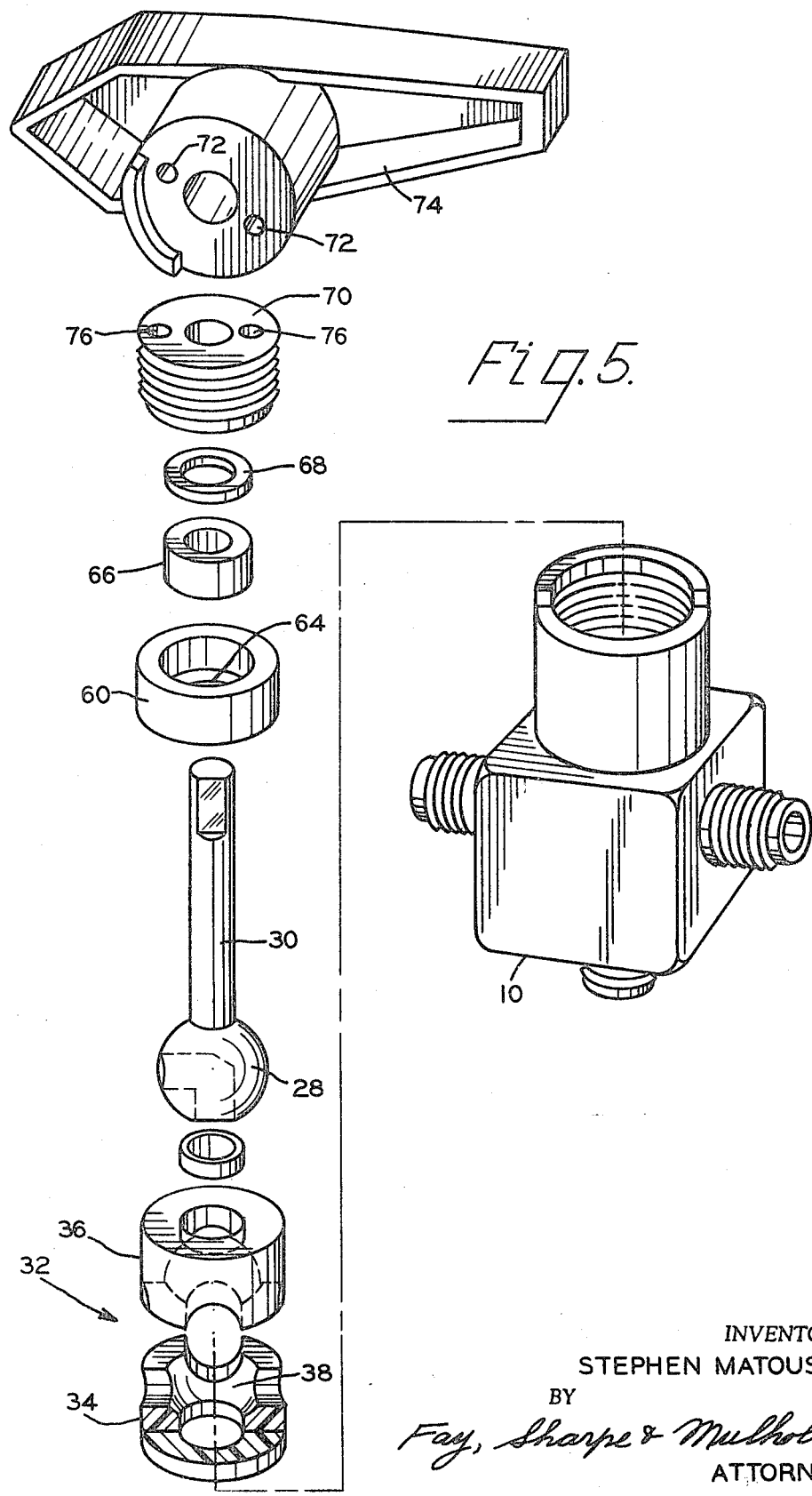

BALL VALVE AND IMPROVED SEAT ARRANGEMENT

This is a continuation, of application Ser. No. 41,503, filed May 28, 1970, and now abandoned.

The subject invention is directed toward the valve art and, more particularly, to a ball valve having an improved seat or seal arrangement.

The invention is concerned with a ball valve of the type wherein the ball is enclosed or encapsulated within a preloaded packing of synthetic, resilient, resinous material such as polytetrafluoroethylene. The invention specifically concerns the relationship between the packing and seat rings positioned adjacent the inlet and outlet ports.

The invention is also concerned with an arrangement which facilitates the provision of ball valves having multiple inlets and outlets to provide plural fluid switching functions.

Encapsulated ball valves have achieved a substantial degree of success, especially, in the smaller sizes used for instrumentation and similar control functions. The valves typically include a one piece, machined housing having a cylindrical valve chamber with inlet and outlet passages extending through the housing and diagonally into the chamber. The ball element is generally rotatably mounted in the chamber with its center positioned on the intersection of the axes of the passages and the axis of the chamber. The packing substantially completely fills all voids between the chamber wall and the ball, except for ports formed through the packing between the passages and the ball.

In the past it has been known to use metal rings to define the ports in the packing. Each ring was sized to extend between the inner wall of the chamber and the outer surface of the ball. Normally, the rings were machined so that one end conformed to the cylindrical shape of the chamber, while the other end had a concave shape which conformed to the outer surface of the ball.

As can be appreciated, with the construction described it was necessary to hold the rings, the ball and the chamber to extremely close tolerances to prevent tight metal-to-metal contact between the rings and the ball. Alternately, if the rings were too small in their axial length, excessive gaps resulted between the rings and the ball. In such case, a good seal was obtained only after the resinous packing had undergone a substantial amount of cold flow. If a sufficient amount of cold flow could not, or did not, take place, a good seal was never obtained. Further, the unfilled gaps or voids could trap process fluids and allow fluids or contaminants to be carried over when cleaning or changeover of the system was required.

The subject invention overcomes the above problems and provides a valve of the type described that is simpler to manufacture and which assures a proper seal without requiring substantial cold flow of the packing. Generally, the invention contemplates a ball valve including a housing defining a valve chamber which is preferably, but not necessarily, of cylindrical configuration. Inlet and outlet flow passages extend into the housing and connect with the chamber. A ball member is positioned in the chamber with its center located generally at the intersection of the axes of the flow passage and the axis of the chamber. A resilient, resinous packing completely encloses the ball and substantially fills all voids between the ball and the inner walls of the chamber. Circular ports are formed through the packing at locations aligned with the inlet and outlet passages and the center of the ball. The outer ends of the ports terminate at the inner of the chamber and about the associated passageway, whereas, the inner ends of the ports terminate adjacent the surface of the ball. A circumferential, cylindrical recess is formed inwardly from the outer end of each port and terminates closely adjacent the inner end of the port to leave a continuous circumferential lip of packing material extending radially inwardly of the port adjacent the ball. Positioned in each recess is a relatively rigid ring member having an axial opening of a diameter substantially equal to the diameter of the associated passage, and an outer diameter which engages the wall of the recess. The axial length of the ring is substantially equal to the length of the recess. Preferably, the inner end of the ring closely engages the lip, whereas the outer end is shaped to engage the inner wall of the chamber about the associated port.

Because of the preformed lip which extends radially inwardly substantially the entire thickness of the ring, together with the length relationship between the ring and the recess, a good seal is assured even without cold flow of the packing. Moreover, even if the ring is not of the proper length, the lip alone will still provide an adequate seal. Further, because of the preformed lip, there can never by metal-to-metal contact and rubbing between the ring and the ball.

Another aspect of the invention contemplates that the packing be completely symmetrical about a plane passing through the centerline of the ball, and that rigid disc members extend through the packing at locations symmetrically relative to the ports. Additionally, the packing is preferably provided with lips which extend inwardly about the discs between the discs and the ball.

Accordingly, a primary object of the invention is the provision of an encapsulated type ball valve wherein the capsule or packing is provided with preformed lips which engage the ball and extend between the ball and rigid metal discs or rings mounted at locations corresponding to the locations of the ball valve aperatures.

Another object is the provision of an encapsulated ball valve of the type described wherein the packing is entirely symmetrical and sealing is assured by a lip machined in the packing and pressed into engagement with the ball by rigid ring members extending between the lips and the valve housing.

Another object is the provision of a ball valve having a packing which is entirely symmetrical about the axis of the ball and which has rigid disc members positioned between the ball and the housing at locations corresponding to the positions of the ball aperatures in the normal flow controlling positions of the ball.

Still another object is the provision of a top loaded encapsulated type ball valve wherein the compressive forces within the packing act entirely radially of the ball and wherein lip seals are provided adjacent the ports to assure a fluid tight seal even without cold flow of the packing.

These and other objects and advantages will become apparent from the following description when read in conjunction with the accompanying drawings wherein:

FIG. 1 is a cross-sectional view through a ball valve embodying features of the invention;

FIG. 2 is a cross-sectional view taken on line 2—2 of FIG. 1;

FIG. 5 is an exploded pictorial view of the ball, the packing, the rings and the discs.

Figure 3:
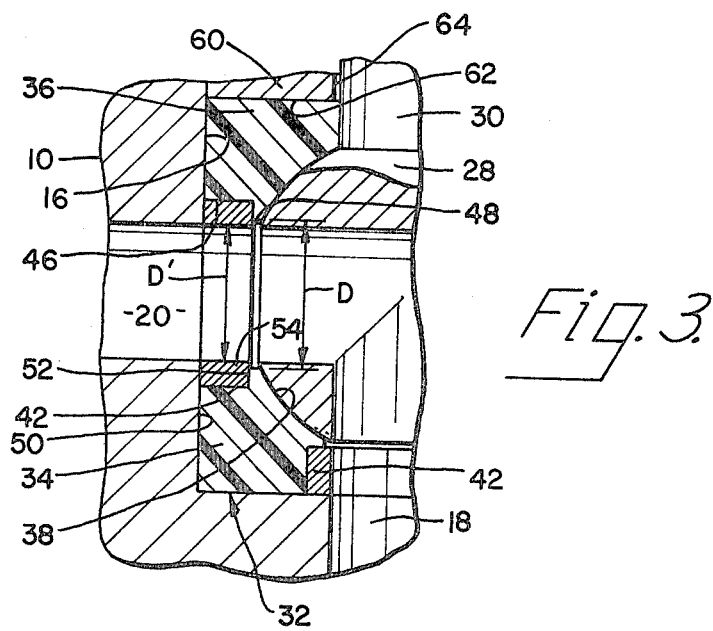
FIG. 3 is an enlarged view of the circled portion of FIG. 1.

Referring in particular to FIG. 1 of the drawings, the overall arrangement of a ball valve incorporating the invention is shown as including a housing 10 which carries a ball and packing assembly 12 and a top loading assembly 14.

In the embodiment under consideration, the housing 10 is machined from a single piece of stock such as brass or stainless steel and is provided with a cylindrical, internal valve chamber 12 formed axially of the body 10. The body is shown as including a first passage 18 which is of cylindrical shape and axially aligned with the valve chamber 16. A second pair of diagonally aligned passages 20 and 22 are formed through the housing or body 10 in aligned relationship and with their axis 24 and 26 aligned with the axis of chamber 16 and perpendicular to the axis of passage 18. Although the valve shown is a three-way valve, the invention could obviously be used on standard two-way valves or any of the multiple port arrangements commonly provided. Further, the housing could be a cast or multi-piece housing if desired.

In the embodiment under consideration, the outer ends of the passages 18, 20 and 22 are provided with tube fitting connections to allow the valve to be connected into a control system through the use of standard tubing connectors. Other types of connecting arrangements, flanges, etc., could equally well be used.

The ball and packing assembly 12 is carried in the valve chamber 16 and includes a ball member 28 having an integral cylindrical actuating stem 30 which is aligned with the center of the ball and extends vertically upward in alignment with the axis of chamber 16. As best shown in FIG. 5, the packing 32 is formed from two pieces of synthetic, resilient resinous material, preferably polytetrafluoroethylene. The two packing sections 34 and 36 are machined from extruded, solid polytetrafluoroethylene, and include inner hemispherical recesses 38 which are adapted to engage the outer surface of the ball 28. The packing sections 34, 36 are also provided with machine passages which receive discs and rings 42. The discs 40 are positioned at locations corresponding to the location of the ball aperature. As discussed in U.S. Pat. No. 3,236,495, issued Feb. 22, 1966 to Buchholz, the discs function to prevent extrusion of the packing material into the valve ball aperature.

It should be noted that the packing sections 34 and 36 are completely symmetrical about a plane perpendicular to the axis of passage 18 and passing through axis 24 passages 20, 22.

Figure 4:
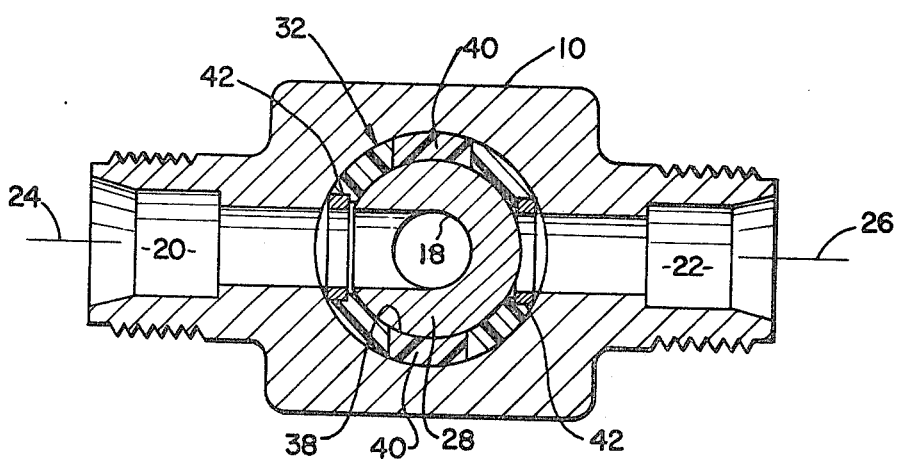
FIG. 4 is an enlarged cross-sectional view taken on line 4—4 of FIG. 2.

As best shown in FIGS. 3 and 4, there is a novel relationship between the packing sections 34, 36 and the ring and disc members 40, 42. As shown in FIG. 3, the opening formed for receiving the ring members 42 have a diameter D which is slightly larger than the diameter of the associated passage. Additionally, a recess of cylindrical configuration is formed from the outer end of the packing opening and extends inwardly to a position closely adjacent the surface of the ball. Note that the recess 36 is cylindrical and is axially aligned with the passage 20. The inner end of the recess 46 is preferably perpendicular to the axis 20. This leaves a lip 48 of packing material which tapers radially inwardly. Positioned within recess 46 and extending between the inner wall 50 of the valve chamber 16 and the rear face 52 of the lip portion 38, is a rigid metal ring member 54. The ring member 54 has an internal diameter D' which is preferably equal to the diameter of the associated passage. When the valves are assembled, the ring member extends between the wall 50 and the lip portion 52 to maintain the lip in engagement with the ball. The remaining ring members are identical and related to the housing and packing in the same manner.

In addition to the relationship of the ring members, the members shown in FIG. 4 are similarly sized and related to the packing to provide a lip portion which extends inwardly circumferentially about the disc between the disc and the ball. As can be appreciated, because of the positions of the rings and the discs, the packing sections can be entirely symmetrical. When the packing, the rings, and the discs have been assembled about the ball, the packing is placed under a compressive preload. In the embodiment under consideration, the packing is top loaded by an adjustable gland member which is the subject of a commonly assigned patent application filed concurrently herewith and entitled "Ball Valve Having Improved Stem Seal and Packing." Briefly, the adjustable loading arrangement includes a gland member 60 of cylindrical shape which is sized so as to be closely received in the upper end of the valve chamber 16. The lower face 62 of the gland member 60 engages the top surface of the packing member 36. The stem 30 extends through the gland member and the gland opening 64 is of a diameter slightly larger than the diameter of the stem. A recess of cylindrical shape is formed axially of the gland and a bushing 66, preferably formed from polytetrafluoroethylene, is received in the recess and closely engages the stem 30. A second gland member in the form of a relatively thin washer 68 is positioned on the upper surface of the bushing 68 and sized so as to be received in the recess of bushing 60. An adjusting nut 70 is threadably received in the outer end of the valve chamber 16. The lower surface of the member 70 engages the gland member 68. By adjusting member 70, the pressure applied to the bushing 66 and, the packing members 34, 36 can be adjusted.

In the embodiment under consideration, adjustment is accomplished by holes 72 which extend through the handle member 74. Similar holes 76 are formed in the nut member 70 so that merely by releasing the handle connecting set screw 80 and inserting small rods or Allen wrenches through the openings 72 and into the openings 76, rotation of the handle will permit the member 70 to be adjusted.

Clearly, many modifications of the preferred embodiment could be made without departing from the scope of the invention. For example, the valve could have many other flow patterns differing from that shown. Note that ports could be positioned at the locations of disc members 40 to provide a four or five-way valve if desired. Similarly, the passage 18 could be eliminated and a disc member 40 positioned at the location of the ring member for passage 18. Similarly, other packing adjustment arrangements could be used without departing from the invention.

The invention has been described in great detail sufficient to enable one of ordinary skill in the valve art to make and use the same. It is our intention to cover all variations and modifications of the preferred embodiment insofar as they come within the scope of the appended claims.

Having thus described our invention, we claim:
1. A ball valve comprising:
a housing having an internal valve chamber;
inlet and outlet flow passages extending through said housing and into said chamber;
a ball member positioned in said chamber and having at least one flow aperature extending therethrough;
a resilient capsule of synthetic resinous material disposed in and substantially filling said chamber and surrounding the outer surface of said ball and sealingly engaging both said ball and the walls of said chamber;
means adjustably applying a compressive loading to said capsule in a direction generally perpendicular to the axis of said flow aperature to compress said capsule into tight engagement with said ball and the walls of said chamber;
ports formed through said capsule at locations corresponding to the locations of said inlet and outlet passages, said ports having a free passage area substantially equal in size and shape to the free passage area of said inlet and outlet passages, each of said ports being defined by a relatively rigid metal ring member closely received in an opening formed in said capsule, each said ring member having a first face closely engaging said housing and a flat second face spaced a short distance from said ball, said capsule having a preformed lip portion which extends inwardly about the second face of said ring a distance slightly less than the thickness of said ring and completely fills the axial space between said ring and said ball at all points radially outwardly of its maximum inward extent, said lip being continuous about said port and sealingly engaging said ball and said second face, said lip being an integral part of said capsule and generating axially directed forces against said second face and said ball due to said compressive loading applied to said capsule.

2. The invention as defined in claim 1 wherein said second face is planar and said lip is machined in said capsule.

3. The invention as defined in claim 1 including a stem member extending into said housing for rotating said ball, said stem member passing through and being sealingly engaged by said capsule.

4. The invention as defined in claim 1 including disc members positioned between said ball member and said chamber, said packing including lip portions extending inwardly between said disc members and said ball.

* * * * *